Feb. 27, 1962 W. E. TEMPLETON 3,022,723
HAY BALER
Filed March 21, 1960 2 Sheets-Sheet 1
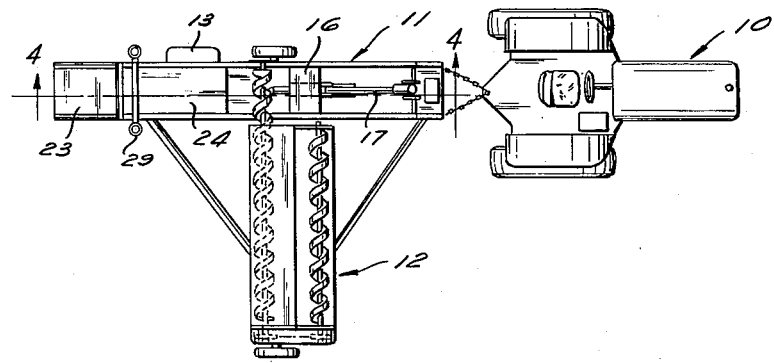
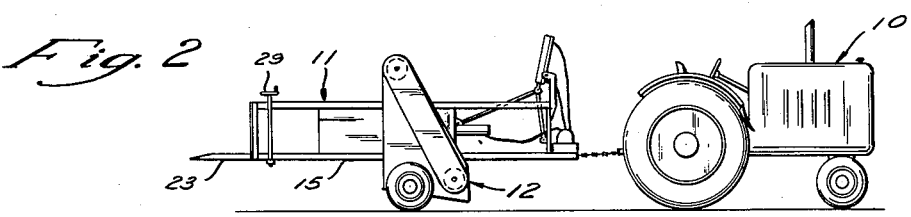
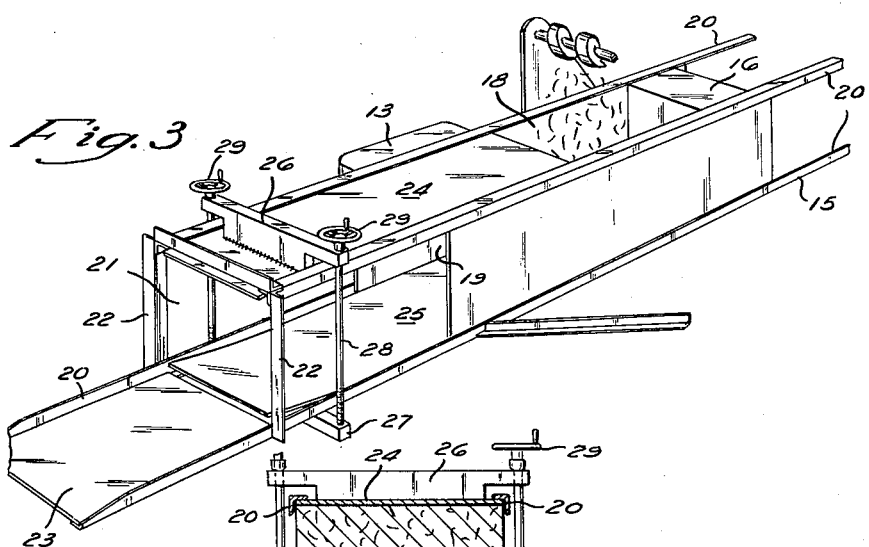
INVENTOR.
WILLIAM E. TEMPLETON
BY
WATTS, EDGERTON, PYLE, & FISHER
ATTORNEYS

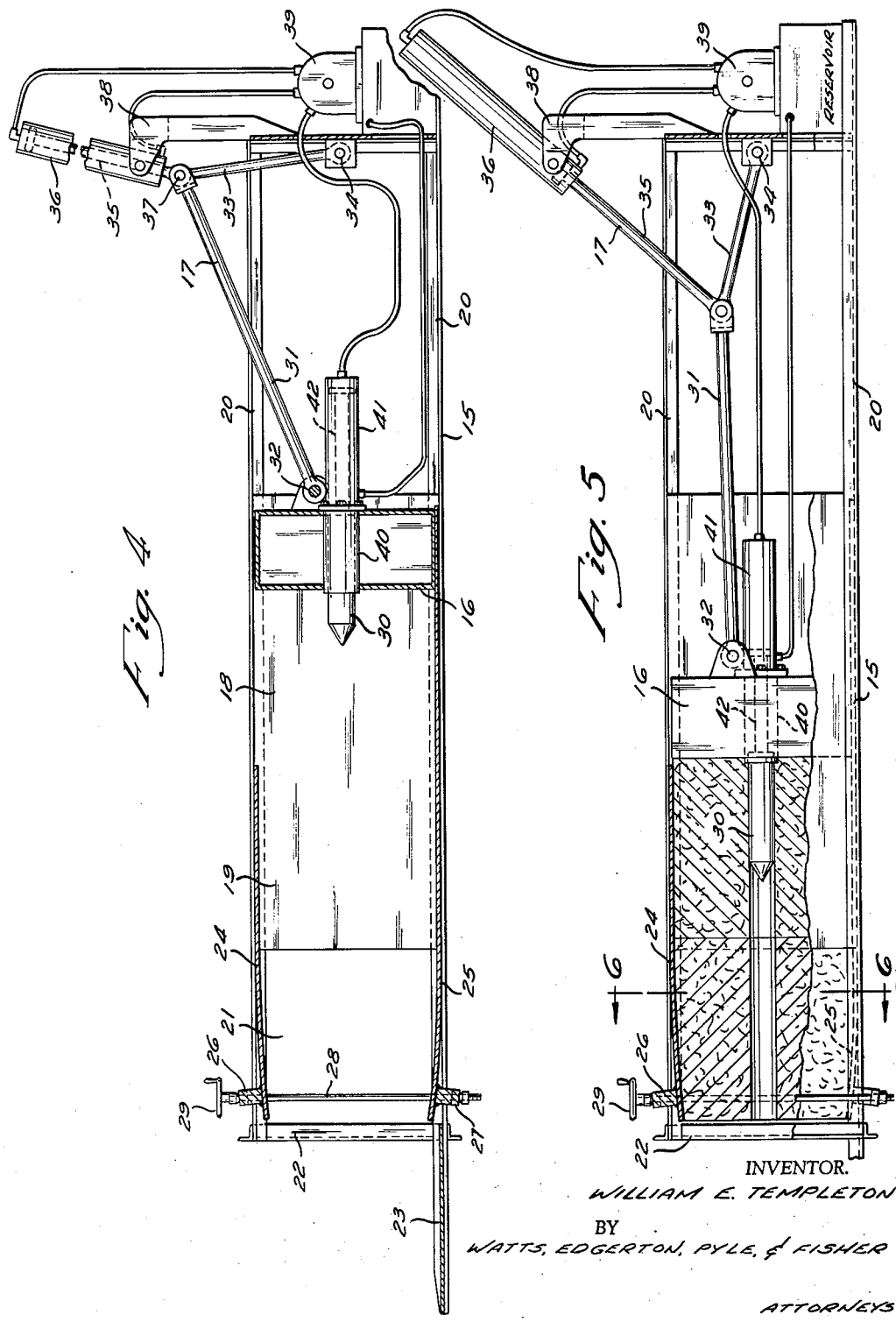

United States Patent Office 3,022,723
Patented Feb. 27, 1962

1

3,022,723
HAY BALER
William E. Templeton, Lexington, Ohio
Filed Mar. 21, 1960, Ser. No. 16,414
2 Claims. (Cl. 100—98)

This invention relates in general to hay baling equipment, and relates in particular to an improved bale form and to the equipment to make the improved bale form.

Until very recent times, the only means for preserving of grass for later use was to allow that grass to completely dry to hay form and then store the hay in dry and well-ventilated barns. This fully dry requirement has been universally observed for both loose and baled hay.

In more recent times there has been a development of storage of hay as green silage, and by a still later development of equipping the barn with forced air drying ducts and then placing the green hay in the barn for further curing. There are many benefits for gathering and storage of green hay, including better nutritional value and less waste because the green or semi-dried material will handle without breaking into small, wasteful pieces.

Of course, the requirement for fully dried hay in former years was because of the fermentation which would cause closely packed, damp hay to spoil, and the kindred hazard of spontaneous combustion if the heat generated by fermentation could not properly escape.

The forced air curing has enabled the farmer to handle loose hay without consideration of weather conditions, and to produce a better and more economical product, and this invention is directed to the concept of enabling the baling of semi-cured hay and similar products and allowing that baled product to finish curing in the baled form. The obvious advantage of economics involved in having less concern for weather conditions and thus being able to cut and bale on a schedule is only one advantage of being able to bale semi-cured hay. Another advantage is that the material is more easily handled without crumbling and subsequent loss of fines.

As this invention is described hereinafter it will refer to the handling of hay. There are other materials that can be handled with like apparatus for the same or similar purposes.

Therefore, an object of this invention is to bale green material into a body having at least one vent opening fully through the body.

Another object of this invention is to provide a machine that will pack a uniform bale with a clean vent opening through the bale.

Another and related object of this invention is to produce a vent opening through a bale by a formation of that vent hole as the bale is packed, in contradistinction to piercing of a hole after the bale is packed.

Other objects and a fuller understanding of the invention may be had by referring to the following description and claims taken in conjunction with the accompanying drawings in which:

FIGURE 1 is a top plan view of a tractor pulling a baling device of the type embodying the features of this invention, and equipped with an auxiliary power loading device;

FIGURE 2 is a side elevational view of the apparatus shown in FIGURE 1;

FIGURE 3 is a perspective view of the discharge end of the baler with the loading apparatus and the forward portion of the baler broken away;

FIGURE 4 is a longitudinal section of the essential structure of the baler mechanism with the baler ram retracted, substantially as taken along the line 4—4 of FIGURE 1, but eliminating any loader or road wheel structure which might otherwise be properly illustrated;

2

FIGURE 5 is a view similar to FIGURE 4 showing the plunger ram advanced in a baling compression stroke; and, FIGURE 6 is an end section view taken along the line 6—6 of FIGURE 5.

Referring now to the several figures of the drawings, the representation of FIGURE 1 is included to set forth a general arrangement of the baler construction as employed in actual practice, and illustrates a tractor 10 employed to provide motive power, a baler 11 embodying the principles of this invention, and a loader from the side, 12, employed to bring cut hay to the baler.

The loader 12 is illustrated as any one of several available types of such loading devices and is completely independent of the present invention. Further, baling devices may load either from the top or from the side, and the present invention is operable with either type of loading device. Top loading into a loading station 18 is illustrated only as a choice.

In the preparation of hay for any type of storage, the field is mown and then raked into a windrow for convenience in mechanical gathering. The time between the mowing and raking into the windrow, and the time that the hay is allowed to lie in the windrow, will determine the dryness and cure of the hay in accordance with the weather conditions. When determined that the gathering shall take place, the tractor and baler are moved between the windrows with the loader 12 moving along and picking the hay from the windrows and moving the gathered hay into the baler 11.

The baler 11, embodying the features of this invention, will be readily understood by reference to the FIGURES 3 through 6. This baler 11 consists of a general box frame 15 with a reciprocating plunger 16 employed to pack the hay. Plunger 16 is reciprocably driven by a drive device 17 and is thereby adapted to compress a loose deposit of hay by driving it forward from loading station 18 into a tunnel section 19 where a given amount of the compressed material in that tunnel section is tied by a tying device 13. As the bales are completed and tied by the device 13, the bale is moved toward the end of the baler and out onto the ground by the pressure of newly forming bales following therebehind.

To describe the baler in more detail, the illustrated embodiment is constructed of four angular tracks 20 which are arranged in box formation defining the general outline of the baler. Necessary cross bracing and structural members are employed to hold the angles 20 in their relative positions, and parts of the sides and top of the box frame is enclosed for specific purposes. By referring to FIGURE 3 it will be seen that the discharge end 21 is defined generally by a framework 22 and a discharge chute 23. A top plate 24 extends from the end 21 forward to the loading station 18. This plate is secured along the two top angles 20 except at the extreme end area near the end 21. A bottom plate 25 extends past the filling or loading station 18 at least to a position coinciding with the furthermost retracted position of the plunger 16, illustrated in FIGURE 4. Thus, the plate 25 forms a bottom surface upon which the loose and baled material is supported. Plate 25 is secured to the bottom angles 20, but as described with respect to the plate 24, the plate is free of the angles near the discharge end 21.

The purpose in allowing the plates 24, 25 to remain disconnected near the end 21 is to produce a variable resistance to the movement of the bale material from the baler and thus determine the weight and density of the bale material. The more resistance offered to movement of the baled material out of the baler, the more compression will take place between the baled material and the plunger 16 as it is driven forward by the drive device 17. As an illustration of the means to adjust this back pressure upon the bale device, a yoke 26 is attached to the top plate 24 and a similar yoke 27 to the bottom plate 25, and the ends of these yokes are connected by draw bars 28 having a threaded interconnection with the yoke 27 and having a hand wheel 29 journaled on the yoke 26. A view of the FIGURE 3 will thus illustrate that the plates 24 and 25 may be adjusted toward or away from one another and thus define a variable opening to determine the resistance necessary to push a bale of material between these openings.

The plunger 16 is guided in reciprocable movement by the angle tracks 20 between a retracted position as shown in FIGURE 4 and an extended position as shown in FIGURE 5. This reciprocable motion is provided by the drive device 17 which consists essentially of arm 31 pivotally connected to the plunger 16 by pivot 32 and arm 33 attached to a stationary portion of the frame 15 by a pivot 34. Arms 31 and 33 are united together and are united to a piston rod 35 of a hydraulic cylinder 36 by means of a pivot joint 37. The cylinder 36 is swivelably mounted upon a support bracket 38 and is supplied by motive fluid under pressure from a conveniently located power pressure source 39 by the usual arrangement of feed lines. Conventional reversing mechanism and on-off controls have not been illustrated, these being conventional and well known in the art.

This apparatus is particularly suited to the present invention because the first movement of the plunger 16 from the position shown in FIGURE 4 is resisted very little by the loose collection of hay in the loading station 18. Therefore, as the cylinder 36 begins the drive operation, it produces a great amount of movement but relatively small power. As the compression stroke proceeds and the hay resists the movement of the piston 16, the arms 31 and 33 are approaching a straight line condition wherein the greatest amount of power and the least amount of movement will be achieved. Thus, as the power requirements go up, the power available is increased to correspond.

The foregoing description has been set forth to give the background environment for the essence of the present invention and to illustrate and describe collateral features which are exceptionally desirable in the operation of the present invention. The essence of this invention is in the production of baled hay and similar materials with a clean opening through each bale in order that the wind in the field may blow through the openings to cause drying of the interior part of the bale, and natural chimney effect will cause air movement as a degree of fermentation and evaporation takes place within the bale which creates heat. This heat can exhaust through the opening of the bale and carry fresh and dry air in to replace the moist, hot air. There are many known means for producing holes through a baled structure, some of which embody piercing of a bale after it has been completed. This invention must be clearly understood not to be a piercing apparatus or process. It is a packing of the loose material around a core and withdrawal of that core from the compressed material before the compression load is taken from the material.

This apparatus provides such structure to carry out the described procedure in the form of a core plunger 30 which is positioned about centrally of the plunger 16 and guided for reciprocable extension from the plunger 16, as illustrated in FIGURE 5, by means of a guide bushing 40. The core plunger 30 is driven in a reciprocable movement by means of a hydraulic cylinder 41 operating a piston rod 42. The cylinder 41 is connected to the source of oil power 39.

It has been found that the apparatus constructed as illustrated will be self-timing with respect to the extension and retraction of the core plunger 30 as the apparatus is cycled.

As previously explained, the supply of oil is directed to the cylinder 36 and to the cylinder 41, in regularly controlled cycles in order to fully extend the plunger 16 to the position illustrated in FIGURE 5 and thereafter to retract this plunger to the position illustrated in FIGURE 4 to permit further loading of the baler for another cycle of compression. Each such compression stroke may compress as much as four inches of additional bale length. When the apparatus is in the position shown in FIGURE 4, the loading station 18 is open and a charge of material will fall in front of the plunger 16. The cycling mechanism then causes oil pressure to go simultaneously to the cylinders 36 and 41. However, the cylinder 36 has a far greater load to move than the cylinder 41 and therefore the core plunger 30 will advance beyond the face of the plunger 16 as the plunger 16 begins to move up into the collection of loose hay. Thus, the core plunger 16 will move ahead into very loose and uncompressed material without any particular resistance to its advance and the material will thereafter be compacted around the core.

Not only does the core 30 serve as a form upon which the loose material is compressed, but also it preferably is long enough to extend into the opening made in the increment of material compressed by the former stroke, or preferably more than one such increment, and serve as a reinforcement support to prevent the formerly made openings from collapsing as the new increment of material is compressed and formed with a central opening. Thus, the repeated stroke of the plunger 16 will build up increments of compressed material, each with its own formed central opening, and at the same time the previously formed increments will be reinforced and the alignment of the openings will be assured. Hence, the bale is molded with a uniform and clean opening throughout the entire body of material as it is formed.

Upon reversal of the oil pressure supply to the cylinders 36 and 41, the plunger 16 will begin to move in a reverse direction and the core 30 will be retracted back into the bushing 40. However, because of the extreme mechanical advantage of the drive device 17 which causes slow reverse movement at first, and the load and resistance upon the plunger 16, as distinguished from the relatively slight load and resistance upon the core 30 because of its smooth wall form, the core 30 will retract at a much greater speed than will the plunger 16. Thus, the core 30 is retracted from the compressed material while a degree of compression force remains on the material by the plunger 16. This withdrawal of the core 30 while the material is still under compression is highly desirable in order to prevent tearing or pulling away of the material around the opening at the face of the last compressed material, as would happen if the core 30 were withdrawn from the material after the pressure had been fully released. This cycling of the core 30 to cause it to advance first, and also to retract first, can be done by separate controls for assured relationship of operation, but it has been found that by the inherent characteristics of the construction as thus illustrated and described that the desired relationship is obtained without the use of auxiliary controls.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A machine for baling hay and similar material, comprising a trough including side and bottom walls, a compression ram in said trough, first hydraulic drive means connected thereto for the reciprocative movement thereof, a core plunger carried by said ram, said core plunger movable in the path of movement of said ram and having a first position extended beyond said ram and a second position retracted with respect to said ram, a second hydraulic drive means connected to said core plunger for the reciprocative movement thereof, means coordinating the core drive means and said ram drive means causing said core plunger to be retracted during the retractive movement of the ram and to protrude beyond the forward face of the ram during the forward movement thereof, a single hydraulic power source operably connected to said first drive means and to said second drive means, said first drive means including a mechanical linkage contrived to decrease the speed and increase the power of said ram as it moves from the rearward position to the forward position, whereby said plunger will form an opening in the hay being baled during the reciprocative movement of the ram.

2. In the device of claim 1, said machine including a frame member stationary relative to the ram, said mechanical linkage having a pair of arms pivotally interconnected, one of said arms being pivotally connected to said ram, the other of said arms being pivotally connected to the frame member, and said hydraulic power source being operably connected to said mechanical linkage adjacent the pivotal interconnection of said arms.

References Cited in the file of this patent

UNITED STATES PATENTS

| | | |
|---|---|---|
| 960,796 | Bishop | June 7, 1910 |
| 1,045,125 | Dain | Nov. 26, 1912 |
| 2,420,923 | West | May 20, 1947 |
| 2,654,308 | Millard | Oct. 6, 1953 |